(12) United States Patent
Yang et al.

(10) Patent No.: US 8,351,860 B2
(45) Date of Patent: Jan. 8, 2013

(54) METHOD AND APPARATUS FOR COMMUNICATING USING EXPANSION OF COMMUNICATION RANGE

(75) Inventors: Pil-seung Yang, Suwon-si (KR); Bo-hyun Kyung, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 796 days.

(21) Appl. No.: 12/398,325

(22) Filed: Mar. 5, 2009

(65) Prior Publication Data

US 2010/0029207 A1  Feb. 4, 2010

(30) Foreign Application Priority Data

Aug. 4, 2008  (KR) .................. 10-2008-0075996

(51) Int. Cl.
   *H04B 7/00* (2006.01)
(52) U.S. Cl. ...................................... 455/41.3; 455/41.1
(58) Field of Classification Search .................. 455/11.1, 455/456.5, 456.1, 41.1–41.3
   See application file for complete search history.

(56) References Cited

U.S. PATENT DOCUMENTS

| | | | |
|---|---|---|---|
| 7,092,713 B2 * | 8/2006 | Raji | 455/445 |
| 7,623,512 B2 * | 11/2009 | Kim et al. | 370/370 |
| 7,706,814 B2 * | 4/2010 | Sillasto et al. | 455/456.5 |
| 7,987,051 B2 * | 7/2011 | Gnanasambandam et al. | 701/300 |

* cited by examiner

*Primary Examiner* — Dinh T. Le
(74) *Attorney, Agent, or Firm* — Sughrue Mion, PLLC

(57) ABSTRACT

Provided are a communication method and apparatus for communicating between remote devices, in which a first device determines whether a second device is located within a second distance in which the second device can communicate with the first device via a third device and a fourth device which are remote devices relaying communication between the first and second devices, and then communicates with the second device according to the determination result.

17 Claims, 8 Drawing Sheets

METHOD AND APPARATUS FOR COMMUNICATING USING EXPANSION OF COMMUNICATION RANGE

CROSS-REFERENCE TO RELATED PATENT APPLICATION

This application claims priority from Korean Patent Application No. 10-2008-0075996, filed on Aug. 4, 2008 in the Korean Intellectual Property Office, the disclosure of which is incorporated herein in its entirety by reference.

BACKGROUND OF THE INVENTION

1. Field of the Invention

Methods and apparatuses consistent with the present invention relate to communicating between remote devices.

2. Description of the Related Art

As convergence of devices becomes accelerated without respect to time and place, communication is highly likely to be established between devices directly, not via an additional network apparatus, such as a base station or an access point.

Devices freely constitute a network using a wireless communication interface and communicate with one another via the network without a network apparatus, such as a base station or an access point, which is used to constitute and manage a network, and the network vanishes when the communication ends.

In general, in an adhoc network via which devices can directly communicate with one another, a right of communication is assigned based on the distance between the devices. For example, a first device is given a right to communicate with a second device only when the second device is located within a predetermined communication distance.

In the case of Bluetooth, which is one of short distance wireless communication techniques, a first device discovers whether a second device capable of communicating with the first device via the Bluetooth exists within a predetermined communication distance, and establishes communication with the second device by exchanging identifiers and personal identification number codes with the second device when the second device is discovered. That is, in order to allow devices within a short distance to constitute a communication network based the distance between the devices, the devices need to be located within a predetermined distance.

SUMMARY OF THE INVENTION

The present invention provides a method and apparatus for communicating between remote devices.

The present invention also provides a computer readable medium having recorded thereon a computer program for executing the method for communicating between remote devices.

According to an aspect of the present invention, there is provided a method of allowing a first device to communicate with a second device, the method including determining whether the second device is located within a second distance in which communication between the first and second devices is allowed, based on a first distance which is the sum of the distance between the first device and a third device and the distance between the second device and a fourth device; and communicating with the second device according to the determination result, wherein the third device and the fourth device are remote devices exchanging information regarding the distances between the first and third devices and between the second and fourth devices to establish communication between the first device and the second device.

The determining of whether the second device is located within the second distance may include determining whether the first distance is less than the second.

The determining of whether the second device is located within the second distance may include determining whether the sum of the first distance and a predetermined distance is less than the second distance.

The determining of whether the second device is located within the second distance may include determining whether the result of subtracting a predetermined distance from the first distance is less than the second distance.

The first distance may be measured based on intensity of a signal used to exchange data between the first device and the third device and between the second device and the fourth device.

The third device and the fourth device may exchange data generated when the first device and the second device communicate with each other.

According to another aspect of the present invention, there is provided an apparatus for allowing a first device to communicating with a second device, the apparatus including a determination unit determining whether the second device is located within a second distance in which communication between the first and second devices is allowed, based on a first distance which is the sum of the distance between the first device and a third device and the distance between the second device and a fourth device; and a communication unit communicating with the second device according to the determination result, wherein the third device and the fourth device are remote devices exchanging information regarding the distances between the first and third devices and between the second and fourth devices to establish communication between the first device and the second device.

According to another aspect of the present invention, there is provided a computer readable medium having recorded thereon a computer program for executing the above methods of communicating between devices.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

Exemplary embodiments of the present invention will now be described in detail with reference to the attached drawings.

Figure 1:
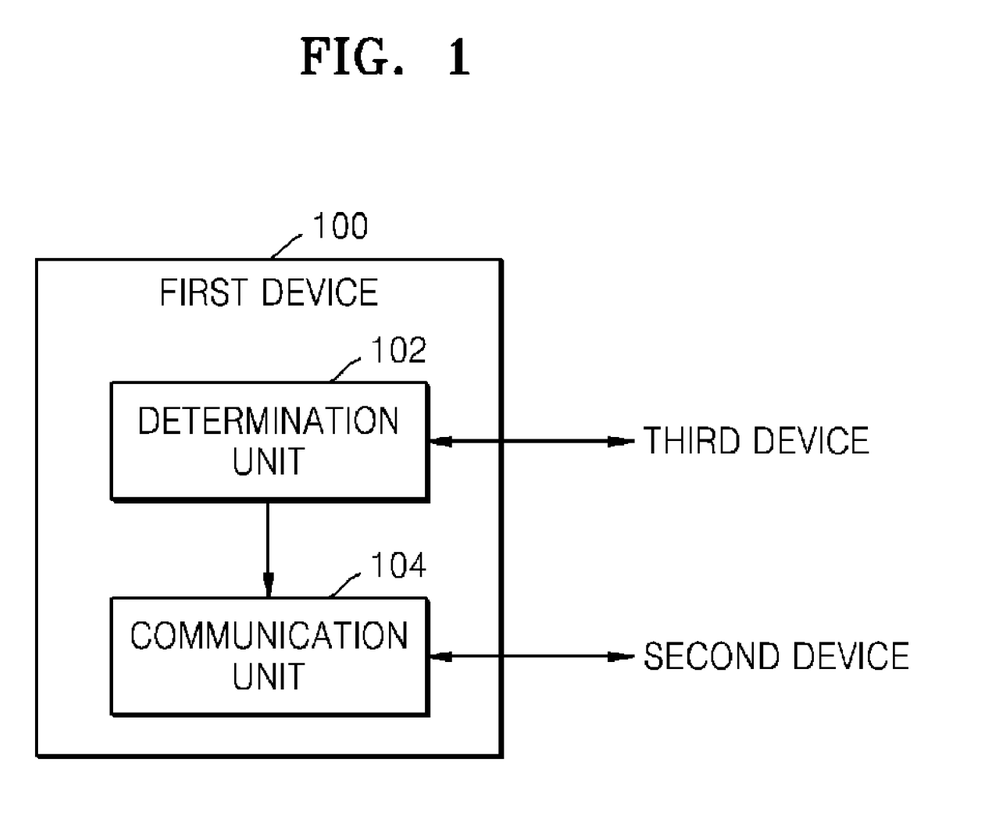
FIG. 1 is a block diagram of a communication device according to an exemplary embodiment of the present invention.

FIG. 1 is a block diagram of a communication device, i.e., a first device 100, according to an exemplary embodiment of the present invention. Referring to FIG. 1, the first device 100 includes a determination unit 102 and a communication unit 104. The first device 100 assigns a right of communication to only devices located within a predetermined distance from the first device 100.

The determination unit 102 determines whether a second device exists within the predetermined distance based on a first distance that is the sum of the distance between the first device 100 and a third device and the distance between the second device and a fourth device. Whether communication is to be established between the first device 102 and the second device 200 is determined according to the determination of the determination unit 102, which will be described in detail with reference to FIG. 2.

Figure 2:
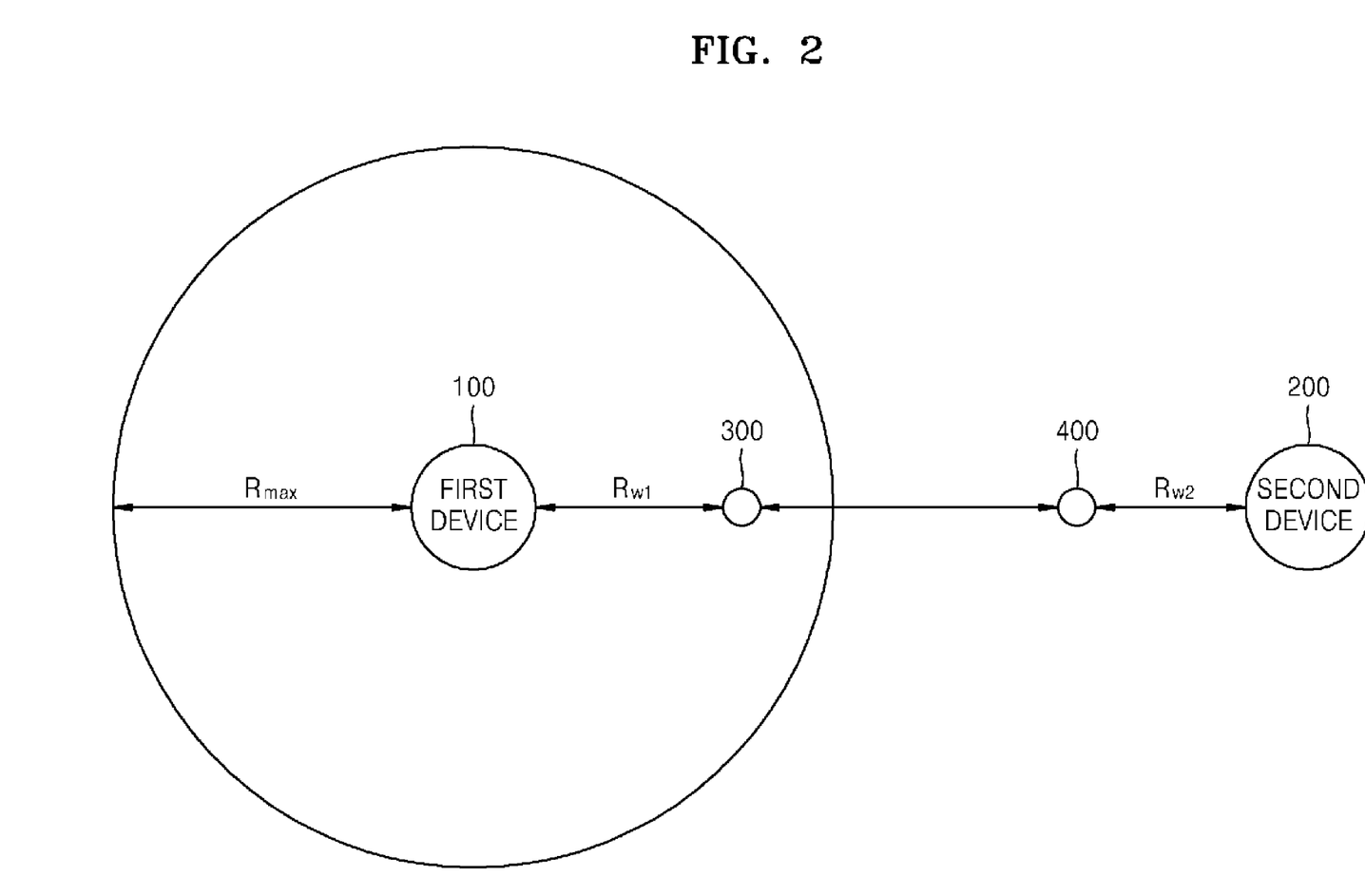
FIG. 2 is a diagram of a network construction illustrating a communication method according to an exemplary embodiment of the present invention.

FIG. 2 is a diagram of a network construction illustrating a communication method according to an exemplary embodiment of the present invention. Referring to FIG. 2, a first device 100 establishes communication with a second device 200 by using a third device 300 and a fourth device 400. The third device 300 and the fourth device 400 relay communication between the first device 100 and the second device 200, and exchange information regarding the distance between the first device 100 and the third device 300 and the distance between the second device 200 and the fourth device 400 with each other.

The distance between the first device 100 and the third device 300 and the distance between the second device 200 and the fourth device 400 may be measured based the intensities of signals exchanged between the devices. For example, the intensity of a signal used for the first device 100 to access the third device 300 is greatly, inversely proportional to the distance between the first device 100 and the third device 300, and is measured by the third device 300. Thus, the third device 300 measures the distance between the first device 100 and the third device 300 by measuring the intensity of the signal received from the first device. The distance between the second device 200 and the fourth device 400 may be measured in a similar manner.

As described above, the first device 100 communicates with only devices located within a maximum communication distance $R_{max}$ from the first device 100. Thus, conventionally, the first device 100 cannot communicate with the second device 200 located beyond the maximum communication distance $R_{max}$.

However, according to an exemplary embodiment of the present invention, the first device 100 can communicate with the second device 200 located beyond the maximum communication distance $R_{max}$, owing to the third and fourth devices 300 and 400 relaying communication between the first device 100 and the second device 200.

In other words, even the second device 200 that is not located within a short distance from the first device 100 can communicate with the first device 100 since the distance between the third and fourth devices 300 and 400 relaying communication is extended. In this case, it is possible to maintain security of communication by allowing the second device 200 to communicate with the first device 100 only when the second device 200 is located within a predetermined distance from the fourth device 400.

Referring to FIG. 2, if the distance between the first device 100 and the third device 300 which is a relay device is $R_{w1}$, the determination unit 102 of FIG. 1 allows communication between the first and second devices 100 and 200 when the determination unit 102 determines that the distance $R_{w2}$ between the second device 200 and the fourth device 400 which is another relay device connected to the third device 300 satisfies a specific condition.

For example, if the determination unit 102 determines that a first distance, i.e., $R_{w1}+R_{w2}$, that is the sum of the distance between the first device 100 and the third device 300 and the distance between the fourth device 400 and the second device 200 is less than the maximum communication distance $R_{max}$, the determination unit 102 determines that the first device 100 can communicate with the second device 200.

Whether the sum of the distances $R_{w1}$ and $R_{w2}$ is less than the maximum communication distance $R_{max}$ is determined while ignoring the distance between the third device 300 and the fourth device 400 which are relay devices. Since the maximum communication distance $R_{max}$ is fixed, a maximum distance between the second device 200 and the fourth device 400 is determined according to the distance between the first device 100 and the third device 300 (see FIG. 3 for more details).

Figure 3:
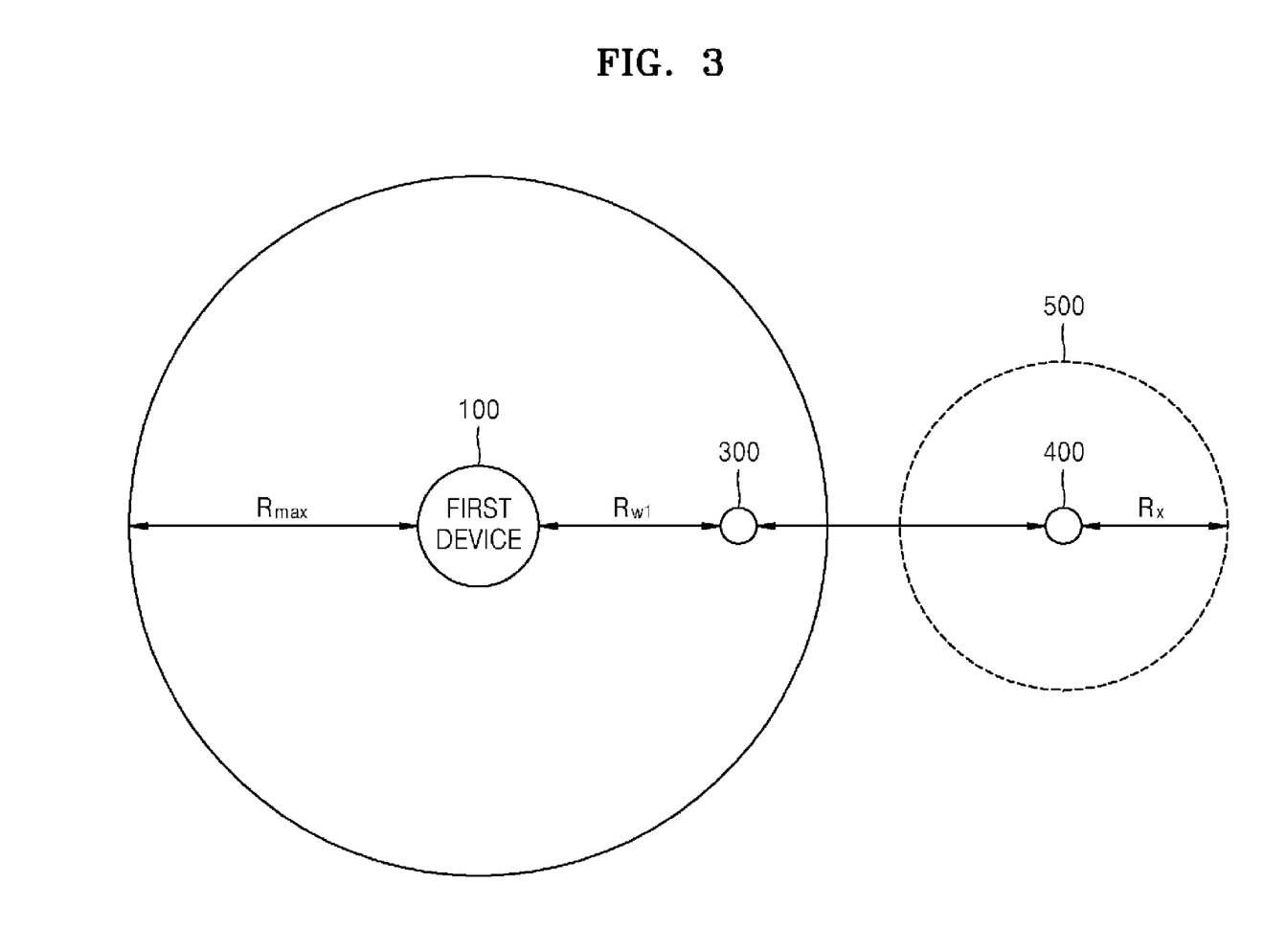
FIG. 3 is a diagram of a network construction illustrating a communication distance according to an exemplary embodiment of the present invention.

FIG. 3 is a diagram of a network construction illustrating a communication distance according to an exemplary embodiment of the present invention.

Referring to FIG. 2, the distance $R_{w2}$ between the second device 200 and the fourth device 400 should be from 0 to $(R_{max}-R_{w1})$ in order to establish communication between the first and second devices 100 and 200. As previously described with reference to FIG. 2, the first device 100 can communicate with the second device 200 when the first distance $R_{w1}+R_{w2}$ is less than the maximum communication distance $R_{max}$. Thus, the distance $R_{w2}$ between the second device 200 and the fourth device 400 must be less than the maximum communication distance $R_x=R_{max}-R_{w1}$. That is, the first device 100 and the second device 200 can communicate with each other when the second device 200 is included in a predetermined region 500 as illustrated in FIG. 3.

A maximum distance $R_x=R_{max}-R_{w1}$ between the second device 200 and the fourth device 400 for communicating between the first device 100 and the second device 200 is a function of the distance $R_{w1}$ between the first device 100 and the third device 300, and therefore, the maximum distance $R_{max}-R_{w1}$ may be controlled by adjusting the distance $R_{w1}$. For example, a decrease in the distance $R_{w1}$ between the first device 100 and the third device 300 results in an increase in the maximum distance $R_x=R_{max}-R_{w1}$ between the second device 200 and the fourth device 400, thereby increasing the size of the region 500. On the contrary, an increase in the distance $R_{w1}$ between the first device 100 and the third device 300 results in a decrease in the maximum distance $R_x=R_{max}-R_{w1}$ between the second device 200 and the fourth device 400, thereby reducing the size of the region 500.

Referring to FIGS. 2 and 3, the determination unit 102 considers the distance between the third device 300 and the fourth device 400 as being zero, and determines whether the first distance $R_{w1}+R_{w2}$ that is the sum of the distance between the first device 100 and the third device 300 and the distance between the fourth device 400 and the second device 200 is less than the maximum communication distance $R_{max}$ of the first device.

However, whether to establish communication between the first and second devices 100 and 200 may be determined by considering that the distance between the third device 300 and the fourth device 400 is a predetermined positive or negative distance. In other words, the determination unit 102 may allow communication between the first and second devices 100 and 200 only when $((R_{w1}+R_{w2})+\alpha)$ or $((R_{w1}+R_{w2})-\alpha)$ is less than the maximum communication distance $R_{max}$ of the first device 100. Here, $\alpha$ is a value determined according to a network environment to which the current exemplary embodiment is applied and thus may be unrelated to the actual distance between the third device 300 and the fourth device 400.

If the value $\alpha$ is a positive value and the distance $R_{w1}$ between the first device 100 and the third device 300 is fixed, the greater the absolute value of the value $\alpha$, the smaller the maximum distance $R_x$ between the second device 200 and the fourth device 400.

On the other hand, if the value $\alpha$ is a negative value and the distance $R_{w1}$ between the first device 100 and the third device 300 is fixed, the greater the absolute value of the value $\alpha$, the greater the maximum distance $R_x$ between the second device 200 and the fourth device 400.

Referring back to FIG. 1, when the determination unit 102 determines that $(R_{w1}+R_{w2})$, $((R_{w1}+R_{w2})+\alpha)$, or $((R_{w1}+R_{w2})-\alpha)$ is less than the maximum communication distance $R_{max}$, the communication unit 104 communicates with the second device 200 by transmitting selected data to the second device 200 or receiving data from the second device 200. In this case, data may be transmitted and received either via the third device 300 and the fourth device 400 which are relay devices or by directly accessing the second device 200.

If the first device 100 transmits data to the second device 200 via the third and fourth devices 300 and 400, the third and fourth devices 300 and 400 not only establish communication between the first and second devices 100 and 200 but also act as proxies relaying transmitting and receiving of data between the first and second devices 100 and 200.

Referring to FIG. 1, the first device 100 determines whether to communicate with the second device based on the sum of the distance between the first device 100 and the third device and the distance between the second device and the fourth device and selectively communicates with the second device according to the determination result.

However, according to another exemplary embodiment of the present invention, the first device 100 transmits data, which is to be provided to other devices, to the fourth device 400 via the third device 300 beforehand and then the fourth device 400 provides the data received from the first device 100 to the second device 200 only when the second device 200 enters a predetermined region 500. In this exemplary embodiment, the first device 100 does not need to include the determination unit 102 and includes only the communication unit 104 that transmits data, which is to be provided to other devices, to the fourth device 400 via the third device 300.

Figure 4:
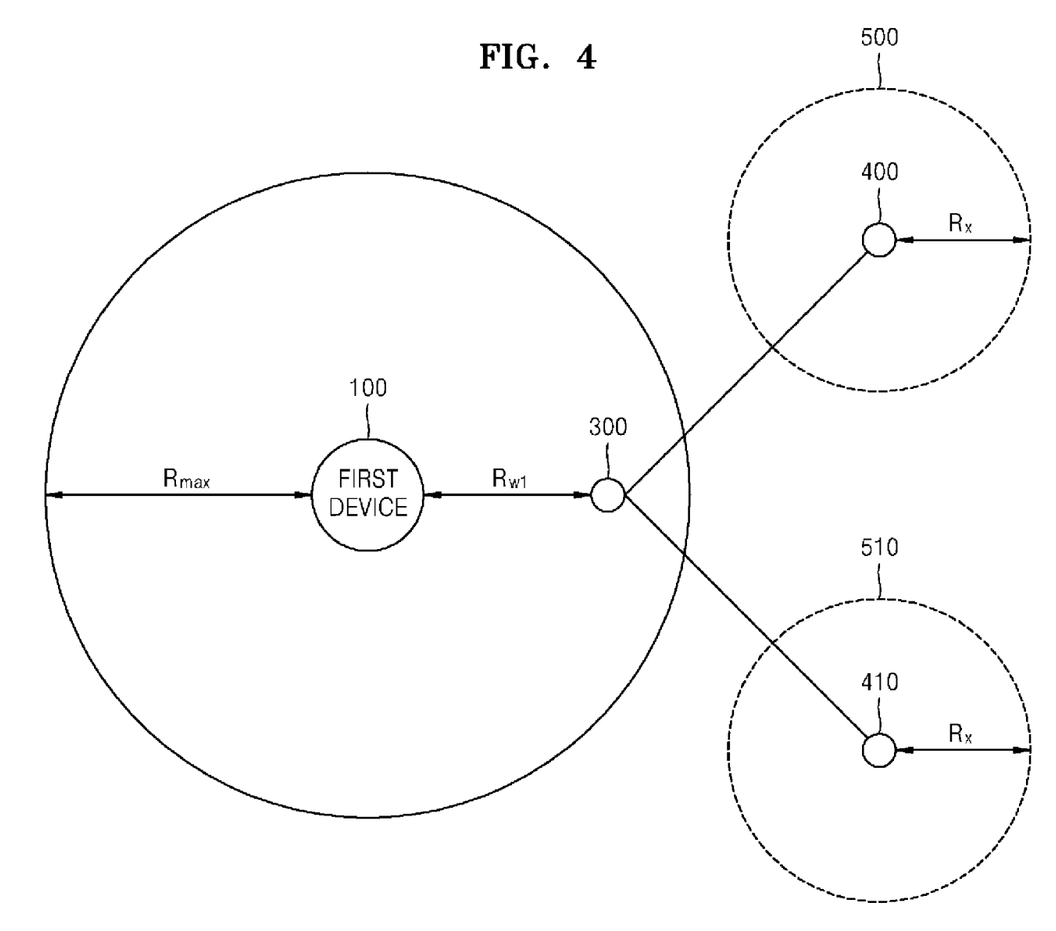
FIG. 4 is a diagram of a network construction illustrating a communication distance according to another exemplary embodiment of the present invention.

FIG. 4 is a diagram of a network construction illustrating a communication distance according to another exemplary embodiment of the present invention.

FIGS. 2 and 3 illustrate cases where the third devices 300 and 400 which are relay devices are connected in a 1:1 relationship. However, according to another exemplary embodiment of the present invention, relay devices may be connected to one another in a 1:n relationship. FIG. 4 illustrates a case where third device 300 is further connected to another device 410 in addition to the fourth device 400 of FIG. 2 or 3. Since the third device 300 is connected to the two devices 400 and 410, the first device 100 can communicate devices in two regions 500 and 510.

Figure 5A:
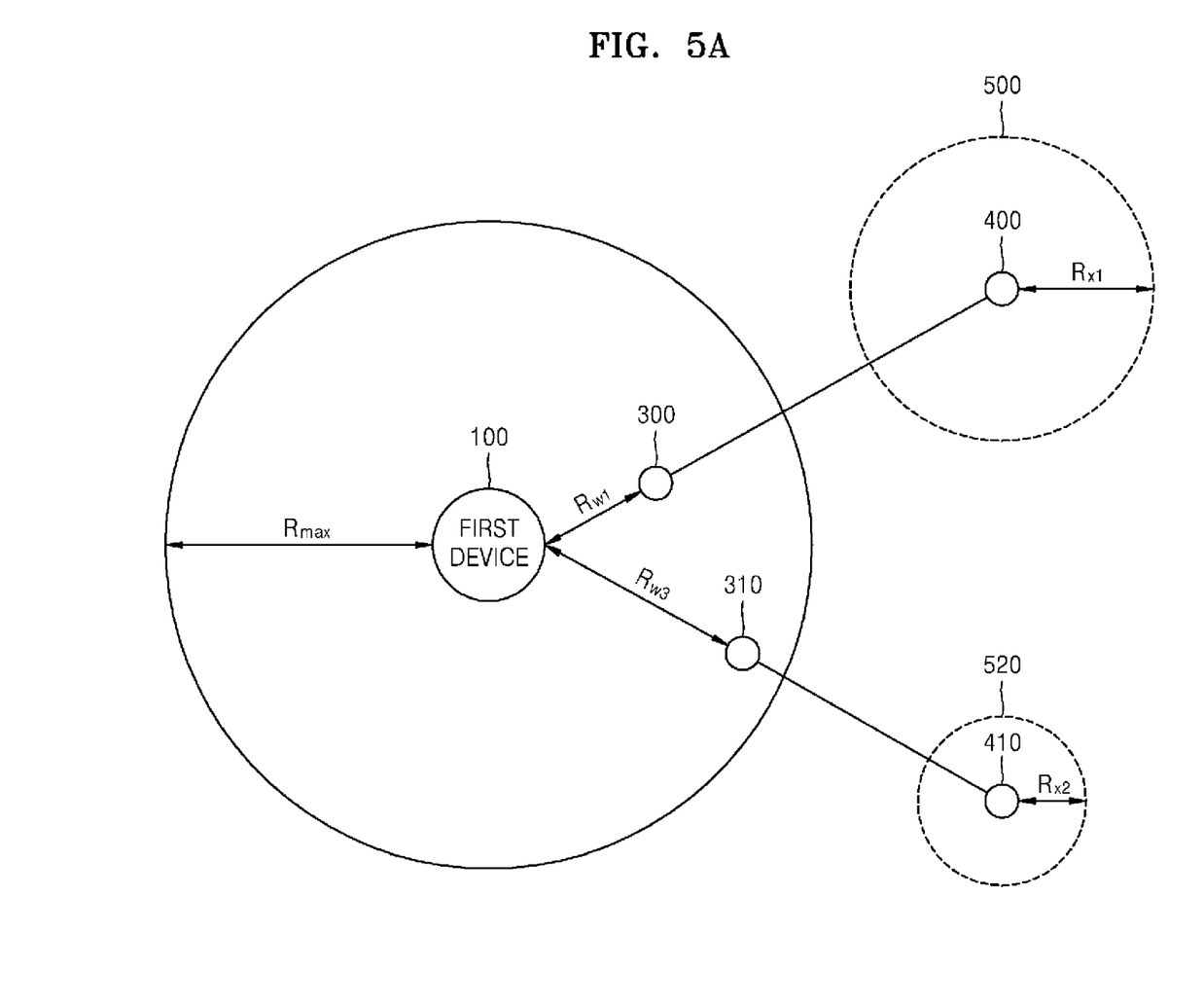
FIGS. 5A and 5B are diagrams of a network construction illustrating a communication distance according to other exemplary embodiments of the present invention.
Figure 5B:
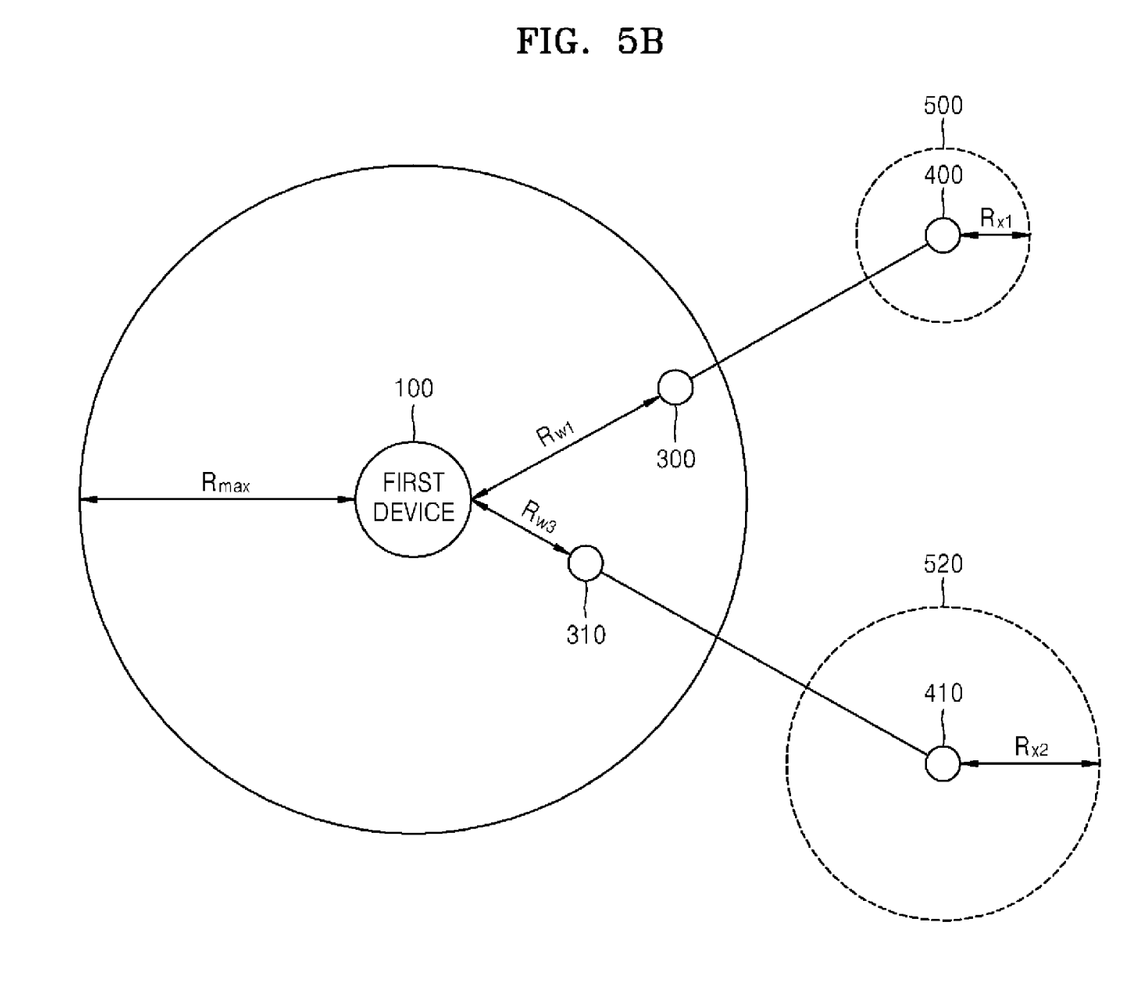

FIGS. 5A and 5B are diagrams of a network construction illustrating a communication distance according to other exemplary embodiments of the present invention.

Unlike FIGS. 2 through 4, FIGS. 5A and 5B illustrate cases where relay devices are connected to one another in an n:n relationship. That is, a third device 300 and a fourth device 400 are connected, and a fifth device 310 and a sixth device 410 which are also relay devices are further connected.

As illustrated in FIG. 5A, when a first device 100 is located near the third device 300, a peripheral region 500 of the fourth device 400 in which communication with the first device 100 is allowed, is larger than a peripheral region 510 of the sixth device 410. This is because the distance $R_{w1}$ between the first device 100 and the third device 300 is less than the distance $R_{w3}$ between the first device 100 and the fifth device 310 such that the result of subtracting the distance $R_{w1}$ from a maximum communication distance $R_{max}$ is greater than the result of subtracting the distance $R_{w3}$ from the maximum communication distance $R_{max}$. However, as illustrated in FIG. 5B, when the first device 100 is located close to the fifth device 310, the distance $R_{w1}$ is greater than the distance $R_{w3}$ and thus the size of the region 500 is less than that of the region 510.

As illustrated in FIGS. 4, 5A and 5B, a region in which the first device 100 can establish communication may be extended not only to a region proximate to the first device 100 but also to regions proximate to a plurality of relay devices. Accordingly, the first device 100 may communicate with devices in various regions.

Figure 6A:
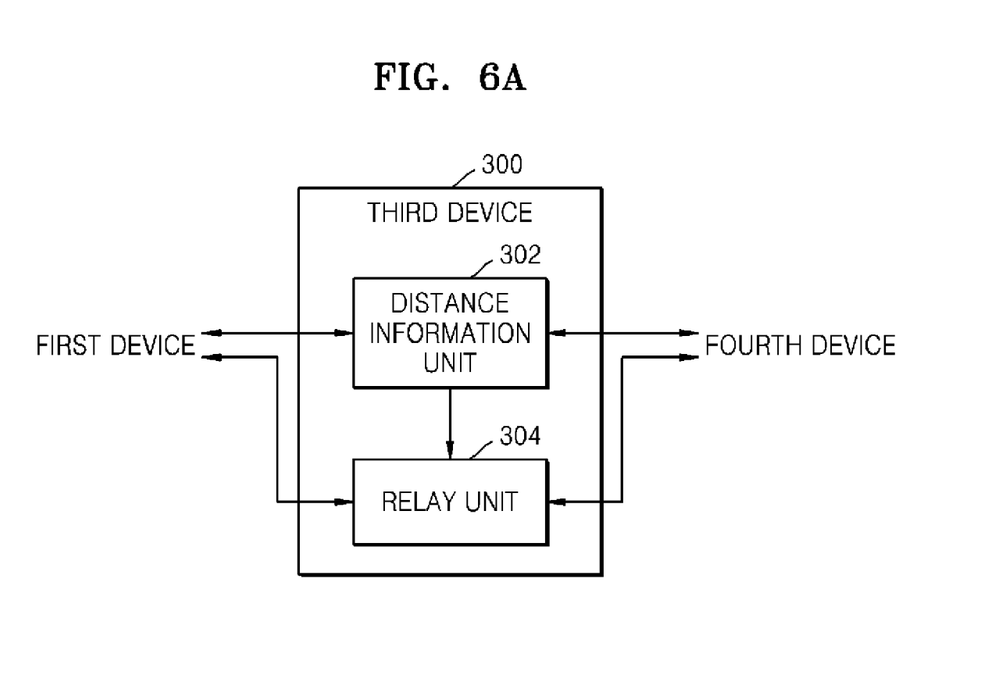
FIGS. 6A and 6B are block diagrams of a relay device according to exemplary embodiments of the present invention.

FIG. 6A is a block diagram of a relay device according to an exemplary embodiment of the present invention. FIG. 6A illustrates the third device 300 which is a relay device adjacent to the first device 100 of FIG. 2

Referring to FIG. 6A, the third device 300 includes a distance information unit 302 and a relay unit 304. The distance information unit 302 calculates the distance $R_{w1}$ between the third device 300 and the first device 100 and transmits the calculation result to a fourth device 400 which is another relay device. The result of subtracting the distance $R_{w1}$ between the first device 100 and the third device 300 from a maximum communication distance $R_{max}$ from the first device 100 may be transmitted to the fourth device 400.

The relay unit 304 relays communication between the first device 100 and the second device 200. In other words, the relay unit 304 receives selected data from the first device 100 and transmits it to the fourth device 400, or receives data from the second device 200 via the fourth device 400 and transmits it to the first device 100. The relay unit 304 relays data when the first device 100 and the second device 200 communicate with each other via the third device 300 and the fourth device 400.

Figure 6B:
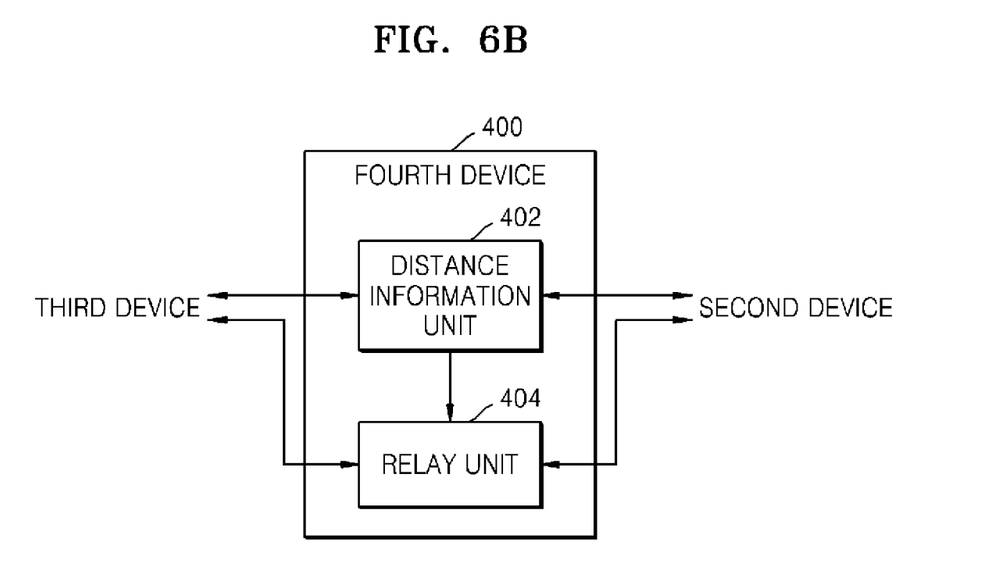

FIG. 6B is a block diagram of a relay device according to another exemplary embodiment of the present invention. FIG. 6B illustrates the fourth device 400 which is a relay device adjacent to the second device 200 of FIG. 2.

Referring to FIG. 6B, the fourth device 400 includes a distance information unit 402 and a relay unit 404, similar to the third device 300 illustrated in FIG. 6A. The distance information unit 402 measures the distance between the second device 200 and the fourth device 400 and transmits the measurement result to the third device 300 which is another relay device.

The relay unit 404 relays communication between the first device 100 and the second device 200. In other words, the relay unit 404 receives selected data from the second device 200 and transmits it to the third device 300, or receives data from the first device 100 via the third device 300 and transmits it to the second device 200. The relay unit 304 relays data when the first device 100 and the second device 200 communicate with each other via the third device 300 and the fourth device 400.

Figure 7:
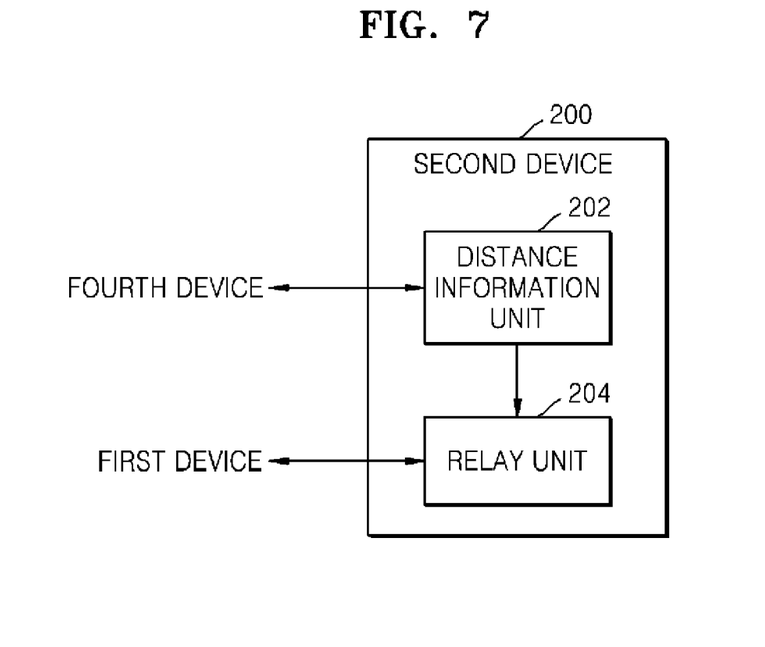
FIG. 7 is a block diagram of a communication device according to an exemplary embodiment of the present invention.

FIG. 7 is a block diagram of a communication device according to an exemplary embodiment of the present invention. FIG. 7 illustrates the second device 200 of FIG. 2.

Referring to FIG. 7, the second device 200 includes a distance information unit 202 and a communication unit 204. The distance information unit 202 communicates with the fourth device 400 which is a relay device so that the fourth device 400 may measure the distance between the second device 200 and the fourth device 400.

The communication unit 204 communicates with the first device 100. When the first device 100 and the second device 200 communicate with each other via the third device 300 and the fourth device 400, the communication unit 202 transmits or receives selected data via the fourth device 400. However, when the second device 200 directly communicates with the first device 100, the communication unit 202 directly accesses the first device 100 to transmit data to or receive data from the first device 100.

In FIGS. 1 through 7, whether the second device 200 is located within the maximum communication distance $R_{max}$ of the first device 100 is determined using the third device 300 and the fourth device 400. However, the third device 300 and the fourth device 400 support bi-directional services and thus may determine whether the first device 100 is located within a maximum communication distance of the second device 200. That is, if the second device 200 assigns a right of communication to only devices located within a predetermined distance, whether the first device 100 is present within the predetermined distance may be determined using the fourth device 400 and the third device 300.

In this case, if the maximum communication distance of the first device 100 is greater than that of the second device 200, the first device 100 may determine that the second device 200 is located within a communication distance and the second device 200 may determine that the first device 100 is not located within a communication distance.

Referring to FIGS. 1 through 7, the first device 100 communicates with the second device 200 only when it is determined based on distance information that the second device 200 is located within a predetermined distance. However, a communication region may be determined using the intensity of a signal instead of the distance information.

Referring to FIG. 2, if the first device 100 transmits a radio-frequency (RF) signal for communication to the third device 300, the third device 300 receives the RF signal, the intensity of which decreases based on the distance between the first device 100 and the third device 300. Then the third device 300 directly transmits the RF signal to the fourth device 400 without decreasing the intensity. The fourth device 400 wirelessly transmits the RF signal received from the third device 300 to the second device 200. The intensity of the RF signal may decrease again when this signal is transmitted to the second device 200, and thus the second device 200 can receive the RF signal only when the second device 200 is located within a predetermined distance from the fourth device 400.

Figure 8:
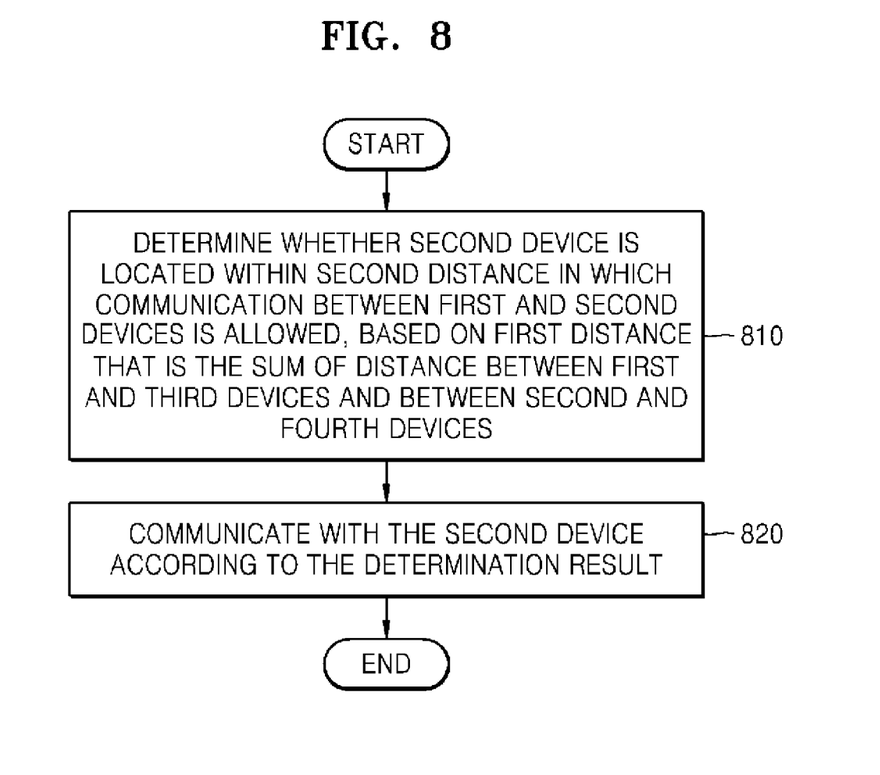
FIG. 8 is a flowchart illustrating a communication method according to an exemplary embodiment of the present invention.

FIG. 8 is a flowchart illustrating a communication method according to an exemplary embodiment of the present invention. In detail, FIG. 8 illustrates a communication method performed between the first and second devices 100 and 200 of FIG. 2.

Referring to FIG. 8, in operation 810, the first device 100 determines whether the second device is located within a second distance in which the second device 200 can communicate with the first device 100, based on a first distance $(R_{w1}+R_{w2})$ that is the sum of the distance $R_{w1}$ between the first device 100 and the third device 300 and the distance $R_{w2}$ between the second device 200 and the fourth device 400.

In this case, it is determined whether the first distance $(R_{w1}+R_{w2})$, the first distance $((R_{w1}+R_{w2})-\alpha)$, or the first distance $((R_{w1}+R_{w2})+\alpha)$ is less than a maximum communication distance $R_{max}$ of the first device 100. A distance may be calculated based on the intensity of a signal.

In operation 820, the first device 100 communicates with the second device 200 based on the determination result in operation 810. If it is determined in operation 810 that the second device 200 is located within the second distance, communication is established between the first and second devices 100 and 200 to exchange data therebetween.

The system according to the present invention can be embodied as computer readable code in a computer readable medium. Here, the computer readable medium may be any recording apparatus capable of storing data that is read by a computer system, e.g., a read-only memory (ROM), a random access memory (RAM), a compact disc (CD)-ROM, a magnetic tape, a floppy disk, an optical data storage device, and so on. The computer readable medium can be distributed among computer systems that are interconnected through a network, and the present invention may be stored and implemented as computer readable code in the distributed system.

While this invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A method of communicating between an apparatus and a remote device through a first device, the method comprising:
    receiving a first signal from the first device by a communication unit of the apparatus;
    determining, based on a strength of the first signal from the first device, a first distance between the apparatus and the first device using a determination unit of the apparatus;
    determining, based on the determined first distance, a second distance between the apparatus and the remote device using the determination unit; and
    establishing a communication, using a communication unit of the apparatus, between the apparatus and the remote device using the communication unit when the determined second distance between the apparatus and the remote device is less than or equal to a predetermined distance between the apparatus and remote device, set by the remote device.

2. The method of claim 1, wherein the first signal includes information regarding a third distance between the remote device and a second device and transmitted from the second device to the first device.

3. The method of claim 2, the method further comprising comparing the predetermined distance set by the remote device with a sum of the first distance and the third distance.

4. The method of claim 2, the method further comprising comparing the predetermined distance set by the remote device with a sum of the first distance, the third distance, and a predetermined value.

5. The method of claim 4, wherein the predetermined value comprises a predetermined positive value and a predetermined negative value, and is determined based on a network environment.

6. The method of claim 2, wherein the first device and the second device are devices exchanging information regarding the distances to establish communication between the apparatus and the remote device, and data generated when the apparatus and the remote device communicate with each other.

7. The method of claim 2, wherein the first device is communicably linked to the apparatus and the second device is communicably linked to the remote device.

8. The method of claim 2, wherein determining the second distance between the apparatus and the remote device comprises determining without regard to a distance between the first device and the second device.

9. A computer readable medium having recorded thereon a computer program for executing the method of claim 1.

10. An apparatus for communicating with a remote device through a first device, the apparatus comprising:
a determination unit which determines a first distance between the apparatus and the first device based on a strength of a first signal from the first device, and determines a second distance between the apparatus and the remote device based on the determined first distance; and
a communication unit which receives the first signal from the first device, establishes a communication between the apparatus and the remote device when the determined second distance between the apparatus and the remote device is less than or equal to a predetermined distance between the apparatus and the remote device set by the remote device.

11. The apparatus of claim 10, wherein the first signal includes information regarding a third distance between the remote device and a second device and transmitted from the second device to the first device.

12. The apparatus of claim 11, wherein the determination unit compares the predetermined distance set by the remote device with a sum of the first distance and the third distance.

13. The apparatus of claim 11, wherein the determination unit compares the predetermined distance set by the remote device with a sum of the first distance, the third distance, and a predetermined value.

14. The apparatus of claim 13, wherein the predetermined value comprises a predetermined positive value and a predetermined negative value, and is determined based on a network environment.

15. The apparatus of claim 11, wherein the first device and the second device are devices exchanging information regarding the distances to establish communication between the apparatus and the remote device, and data generated when the apparatus and the remote device communicate with each other.

16. The apparatus of claim 11, wherein the first device is communicably linked to the apparatus and the second device is communicably linked to the remote device.

17. The apparatus of claim 11, wherein determination unit determines the second distance between the apparatus and the remote device, without regard to a distance between the first device and the second device.

* * * * *